Patented Oct. 2, 1951

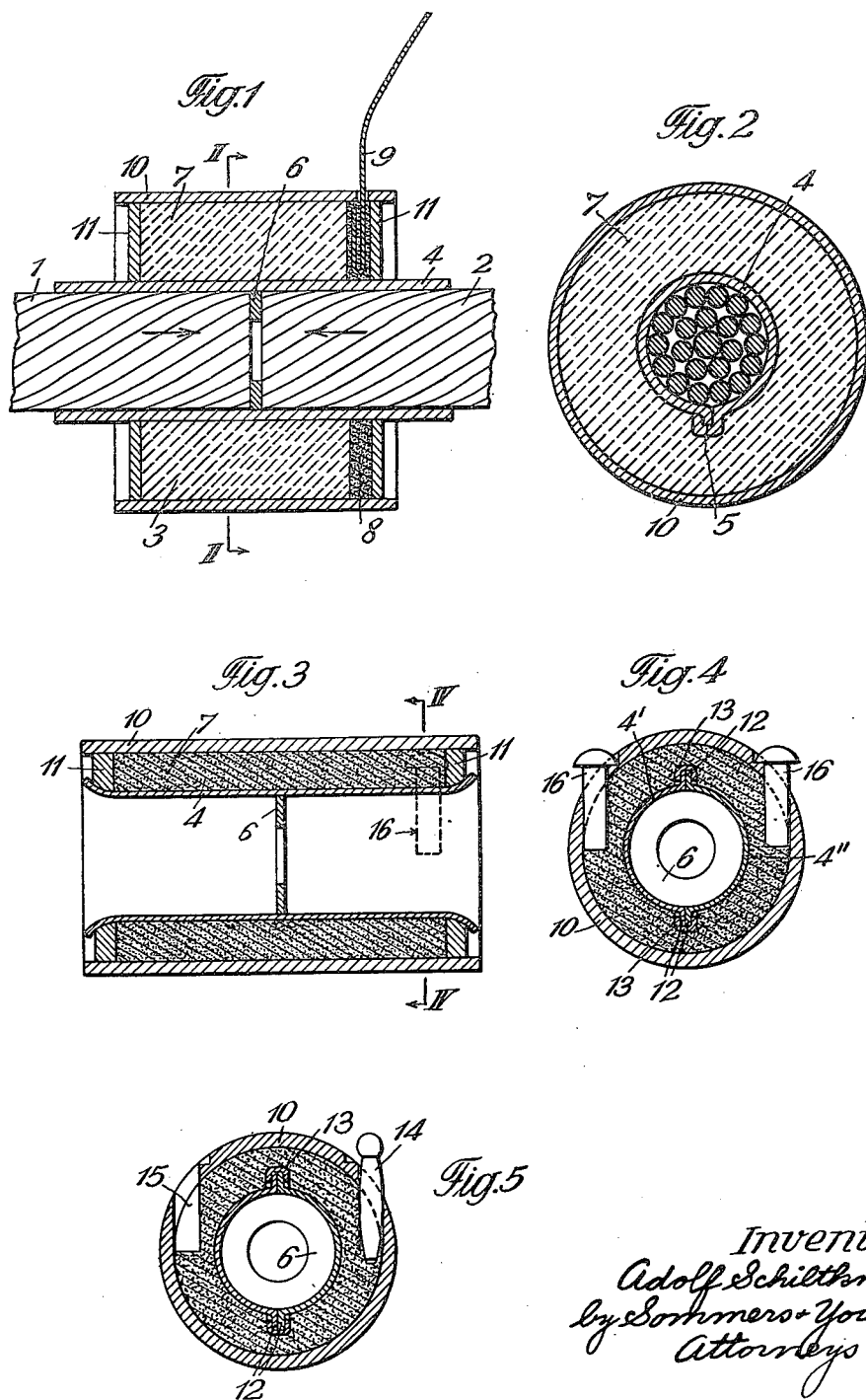

2,569,956

UNITED STATES PATENT OFFICE 2,569,956

CARTOUCHE FOR JOINING METAL BODIES, ESPECIALLY FOR LIGHT METALS, BY WELDING

Adolf Schiltknecht, Neuhausen, Switzerland, assignor to Societe Anonyme pour l'Industrie de l'Aluminium, Chippis, Switzerland Original application December 8, 1943, Serial No. 513,442. Divided and this application October 2, 1946, Serial No. 700,809. In Switzerland September 30, 1942

Section 1, Public Law 690, August 8, 1946
Patent expires September 30, 1962

12 Claims. (Cl. 126—263)

The present invention relates to a cartouch for carrying out a welding process in which a mixture of exothermic reaction serves as the source of heat.

This application is a division of my prior application Serial No. 513,442, filed December 8, 1943, now abondoned.

Processes of this kind are known under the trade name Thermit welding. They are used, for instance, for the welding of abutting rail ends to be joined. The rail ends are surrounded by a mould, into which one pours a Thermit mass which is allowed to react. The molten iron effectuates the welded joint, whereas the slag composed principally of aluminium oxide collects in the upper part of the mould. Of course, this method is only applicable to the joining of iron bodies, as the Thermit mass supplies molten iron. It cannot be applied to other metals, especially not to light metals.

It is also known to butt-weld iron tubes by pouring liquid Thermit mass on the abutting ends and subsequently upsetting; in such case the slag flows round the abutting ends and forms a casing, whereafter the iron of the Thermit mixture solidifies around the slag, so that it is finally possible to remove the iron.

It is an object of the present invention to provide an improved welding cartridge for autogenously joining non-ferrous metal bodies by a welding method which is particularly suitable for butt-welding of aluminium or aluminum alloy rods, extruded sections, tubes and cables and which consists of surrounding the parts to be joined by an alumino-thermic or like exothermic reaction mass, igniting said mass to cause the reaction to take place and retaining the molten products produced by the reaction mass within said mass and excluding said mass from direct contact with the welding, the necessary heat for melting the ends of the metal bodies to be joined by welding being supplied by the exothermic mass. Working pieces of other metals, for example of magnesium, brass and so on, can also be welded by means of the cartouch according to the invention. One may also join together different metals, such as copper with aluminum, taking care that more heat be supplied to the metal having the higher melting point.

The invention consists essentially in providing a cartouch comprising an outer cover, an inner cover having a cross section substantially conforming to the cross-section of the metal bodies to be welded, and an exothermic reaction mass enclosed between said outer and inner covers.

The welding process carried out by means of the improved cartouch consists in bringing together the parts to be joined within the cartouch so that they will be surrounded by the said exothermic reaction mass, and then letting the reaction take place, whereby no molten products escape from the reacting mass and the necessary heat for welding is supplied by the exothermic mass. As distinguished from the known method of Thermit welding of steel, the metal produced by the exothermic reaction of the above process is not used by the weld, but only the heat supplied by the reaction.

It is not in all cases necessary that the parts brought together touch each other prior to the reaction. In particular a contact is unnecessary when the parts to be joined are pressed together after beginning of melting.

This upsetting after beginning of melting is the best practice, as it is the surest warrant for a good welding joint. It is of course possible to insert a small piece of metal (or several pieces) between the parts to be joined, which piece also melts. If such a piece is introduced only after beginning of melting of the parts to be joined, it is possible to upset them by means of the inserted piece, this being particularly advantageous when the parts to be joined cannot be pressed one against the other, for example in the case of bus-bars. It is also possible to place the metal piece near the abutting ends in tight contact with the exothermic mixture, so that it melts and flows between the parts to be joined.

In carrying out the process, care must be taken that the metal which is produced by the reaction of the exothermic mixture does not disturb the welding. This metal (which in practice is always iron) must remain in the reacting mixture and prevented from running out. For this purpose substances which retain the metal formed may be added to the reaction mixture. Such a substance is first of all magnesium oxide. An excess of iron oxides can also be used. The most suitable way however is to choose the reacting substances so that they furnish themselves a slag capable of retaining the metal formed. This can be attained for instance with a mixture of magnesium, alumium and oxides of iron, the amount of magnesium being much greater than the amount of aluminum. A suitable mixture is composed, for example, of 20 to 30% Mg, to 7% Al and 67 to 78% mill scale. Good results have been obtained with a mixture of 24 to 26% Mg, 3 to 5% Al and 69 to 73% mill scale. A mixture of pure magnesium Thermit with an amount of iron oxides in excess of that required for completely oxidizing the magnesium has also proved quite satisfactory. The constituents of the mixture must of course be used in a sufficiently fine state. Generally the rule is true that the reaction is the more violent the finer the powder is. One has to avoid a too violent as well as a too slow reaction.

The reaction is started in known manner, preferably by means of an igniting mixture, consisting for instance of potassium chlorate, aluminum powder, magnesium powder and sulphur.

In particular with the butt-welding of elongated bodies of light metals it is advantageous to surround the ends to be joined with a tube round which the reaction mass is disposed, preferably in briquetted form. In the welding of aluminum the tube can be made of aluminum. The tube melts together with the ends to be joined and can furnish a part of the metal for the weld. A tube made from ceramic material is also utilizable, but somewhat less advantageous. It is generally desirable, for instance in the butt-welding of electrical cables of aluminum, that the weld does not have a substantially greater diameter than the cable itself. In case of necessity, metal in excess must be removed from the joint, suitably by filing or by abrasive means. When working without a tube surrounding the ends to be joined it is practically impossible to prevent the diameter of the weld from becoming greater than the diameter of the joined parts. For the purpose of preventing a too great diameter of the weld or of giving to the weld a predetermined shape, it is suitable to push on the ends to be joined a tube made from a substantially higher melting metal, for instance with aluminum an iron tube, which tube serves as mould and is provided with a longitudinal notch which can be easily opened after the welding operation and the removal of the reacted heating mixture. When it is not a question of butt-welding elongated bodies with a simple cross-section such as rods, cables and tubes, but of cross-sections of other shapes such as T-girders, obviously one should take another suitable mould-like casing instead of a tube.

If tubes or hollow cables, for instance of aluminum, are to be butt-welded so that the hole must remain uninterrupted, one inserts a second tube into the ends to be joined.

The accompanying drawings illustrate two forms of a cartouch according to the present invention.

In the drawings:

Fig. 1 is a longitudinal sectional view of the ends of two aluminum cables to be butt-welded and of the surrounding cartouch of exothermic reacting mixture.

Fig. 2 is a cross section along the line II—II of Fig. 1.

Fig. 3 is a longitudinal section of a slightly modified cartouch.

Fig. 4 is a cross-section along line IV—IV in Fig. 3.

Fig. 5 is a cross-section similar to Fig. 4.

In the accompanying drawings the numerals 1 and 2 designate the ends of a cable which are introduced into a cylindrical hollow cartouch (briquette) 3. This cartouch is provided with an inner iron tube 4, which keeps the metal produced in the reaction mass off the joint and hinders a substantial enlargement of the diameter at the weld. 5 is a longitudinal fold which facilitates the removal of the iron tube after execution of the welding. 6 is an inserted ring of aluminum which acts as an abutment and serves to exactly center the weld. 7 is a reaction mass composed of magnesium, aluminum and mill scale and compressed under high pressure. 8 designates an igniting mixture, which can be ignited by means of the tearing-off strip 9, whereupon the reaction of the Thermit mass starts. 10 is a tube of cardboard provided with two end covers 11 for enclosing the reaction mass. The arrows show the direction of the upsetting pressure.

For security of storage and transportation it is suitable to protect the tearing-off strips and the cartouch by a casing, which protects them at the same time against entrance of moisture. The interstices into which moisture could penetrate may be sealed by means of paraffin.

The cartouch illustrated in Figs. 3–5 differs from that described above inasmuch as the inner iron tube is made in two halves 4' and 4" having abutting flanges 12. Two bars 13 of U-shaped cross-section are placed to embrace the flanges 12 for holding the two halves 4' and 4" together, which bars can easily be removed after the welding. Instead of the tearing-ignition-strip 9 the ignition is effected by means of the head of specially prepared matches (Bengal fire matches) 14 inserted in holes 15. During the transport of the cartouch plugs, for instance rivets 16, are inserted in the holes 15 so that there is no danger of premature ignition of the cartouch.

It has already been pointed out that the safest joint is obtained when the ends are upset one against the other after they begin to melt. For this purpose one uses advantageously an upsetting device provided with two sets of jaws between which the ends to be welded are clamped and which, before the ignition of the reaction mixture, are submitted to spring pressure tending to approach the clamps and thereby the ends one against the other. As soon as the parts to be joined begin to melt, an automatic upsetting through the sets of jaws takes place. The upsetting device can be made so light that it can be, for instance, suspended on overhead transmission cables of aluminum for the purpose of welding them.

The cartouch according to the invention can also be used for the simultaneous welding of more than two bodies. One can also make T-like joints, for example branchings on electrical conductors.

As compared with known welding methods the process using the cartouch according to the invention presents very important advantages. It is not necessary, as with other Thermit welding methods, to have at one's disposal a little foundry equipment. An exceptionally important field of application is the welding of electrical conductors in the open country, especially of high-tension overhead transmission lines, as it is sufficient to carry a handy upsetting device and the necessary number of cartouches.

When the welding must be carried out on the line already suspended on the mast, any other method is hardly applicable.

The cartouch according to the invention moreover allows the joining of bodies of relatively thick cross-section, on which the electric butt-welding would only be possible with extremely powerful machines and the gas welding could no more be applied.

The cartouch can be used by a non-skilled worker.

I claim:

1. A welding cartridge for autogenously welding non-ferrous metal bodies, comprising an inner tubular cover member adapted to closely fit to and surround the metal bodies near the surfaces to be united, an outer tubular cover member surrounding said inner tubular member in spaced relation thereto, an exothermic reaction mass enclosed in the space between said inner and outer tubular members, an igniting mixture also enclosed in the space between said tubular members, and a tearing-off strip partly embedded in the igniting mixture, said tearing-off strip projecting out of said outer tubular member and adapted to be gripped for being torn off to ignite said mixture.

2. A welding cartridge for autogenously welding non-ferrous metal bodies, comprising an inner tubular cover member adapted to closely fit to and surround the metal bodies near the surfaces to be united, an outer tubular cover member surrounding said inner tubular member in spaced relation thereto, an exothermic reaction mass enclosed in the space between said inner and outer tubular members, and an igniting mixture also disposed in the space between said inner and outer tubular members, said outer tubular cover member and said igniting mixture being provided with registering apertures adapted to either receive an ignition match for initiating reaction or a safety plug during transport of the cartridge.

3. A welding cartridge as claimed in claim 2 in which said inner tubular cover member consists of iron.

4. A welding cartridge for autogenously welding non-ferrous metal bodies, comprising an inner tubular cover member adapted to closely fit to and surround the metal bodies near the surfaces to be united, said inner tubular member consisting of iron and having its interior surface coated with a substance preventing alloying between iron and aluminum, an outer tubular cover member surrounding said inner tubular member in spaced relation thereto, an exothermic reaction mass enclosed between said outer and inner tubular members, and an igniting mixture also enclosed between said tubular members, said outer tubular member and the igniting mixture being provided with registering apertures adapted to either receive an ignition match for initiating reaction or a safety plug during transport of the cartridge.

5. A welding cartridge for autogenously welding non-ferrous metal bodies comprising an inner tubular cover member adapted to closely fit to and surrounding the metal bodies near the surfaces to be united, an outer tubular cover member surrounding said inner tubular member in spaced relation thereto, and an exothermic reaction mass composed of finely divided magnesium, aluminum and oxides of iron enclosed between said inner and outer tubular members.

6. A welding cartridge as claimed in claim 5, wherein said exothermic mass is composed of 20–30% magnesium, 2–7% aluminum and 67–78% mill scale.

7. A welding cartridge as claimed in claim 5, wherein said exothermic reaction mass is composed of 24–26% magnesium, 3–5% aluminum and 69–73% mill scale.

8. A welding cartridge as claimed in claim 5, wherein said exothermic reaction mass is composed of magnesium Thermit with an amount of iron oxides in excess of that required for completely oxydizing the magnesium.

9. A welding cartridge as claimed in claim 1, in which said outer and inner tubular members are of cylindrical shape, said inner tubular member being open at both ends to permit insertion of the ends of the metal bodies to be welded from both sides of the tubular member.

10. A welding cartridge for autogenously welding non-ferrous metal bodies, comprising an inner tubular cover member adapted to closely fit to and surround the metal bodies near the surfaces to be united, an outer tubular cover member surrounding said inner tubular member in spaced relation thereto, an exothermic reaction mass enclosed between said two tubular members, and abutment means disposed within said inner tubular member to provide for centering of the weld.

11. A welding cartridge as claimed in claim 1, in which said inner and outer tubular members are formed by concentrically disposed tubes.

12. A welding cartridge for autogenously welding non-ferrous metal bodies comprising an inner tubular cover member adapted to closely fit to and surrounding the metal bodies near the surfaces to be united, an outer tubular cover member surrounding said inner tubular member in spaced relation thereto, an exothermic reaction mass composed of finely divided magnesium, aluminum and oxides of irons enclosed between said inner and outer tubular members, an igniting mixture also enclosed in the space between said tubular members, and a tearing-off strip partly embedded in the igniting mixture, said tearing-off strip projecting out of said outer tubular member and adapted to be gripped for being torn off to ignite said mixture.

ADOLPH SCHILTKNECHT.

REFERENCES CITED

The following references are of record in the file of this patent:

UNITED STATES PATENTS

| Number | Name | Date |
|---|---|---|
| 412,187 | Jeffery | Oct. 1, 1889 |
| 648,475 | White | May 1, 1900 |
| 778,117 | Culin | Dec. 20, 1904 |
| 802,256 | Bamberger et al. | Oct. 17, 1905 |
| 847,668 | Lang | Mar. 19, 1907 |
| 934,711 | Chapman | Sept 21, 1909 |
| 1,246,909 | Schmidt | Nov. 20, 1917 |
| 1,417,075 | LaCour | May 23, 1922 |
| 1,838,357 | Bottrill | Dec. 29, 1931 |
| 2,212,441 | Katz | Aug. 20, 1940 |
| 2,265,172 | Katz | Dec. 9, 1941 |
| 2,388,466 | Galdwell | Nov. 6, 1945 |

FOREIGN PATENTS

| Number | Country | Date |
|---|---|---|
| 248,020 | Germany | June 14, 1912 |